April 2, 1935.   C. H. HAWKINSON   1,996,704
FISHING APPARATUS
Filed Jan. 8, 1934
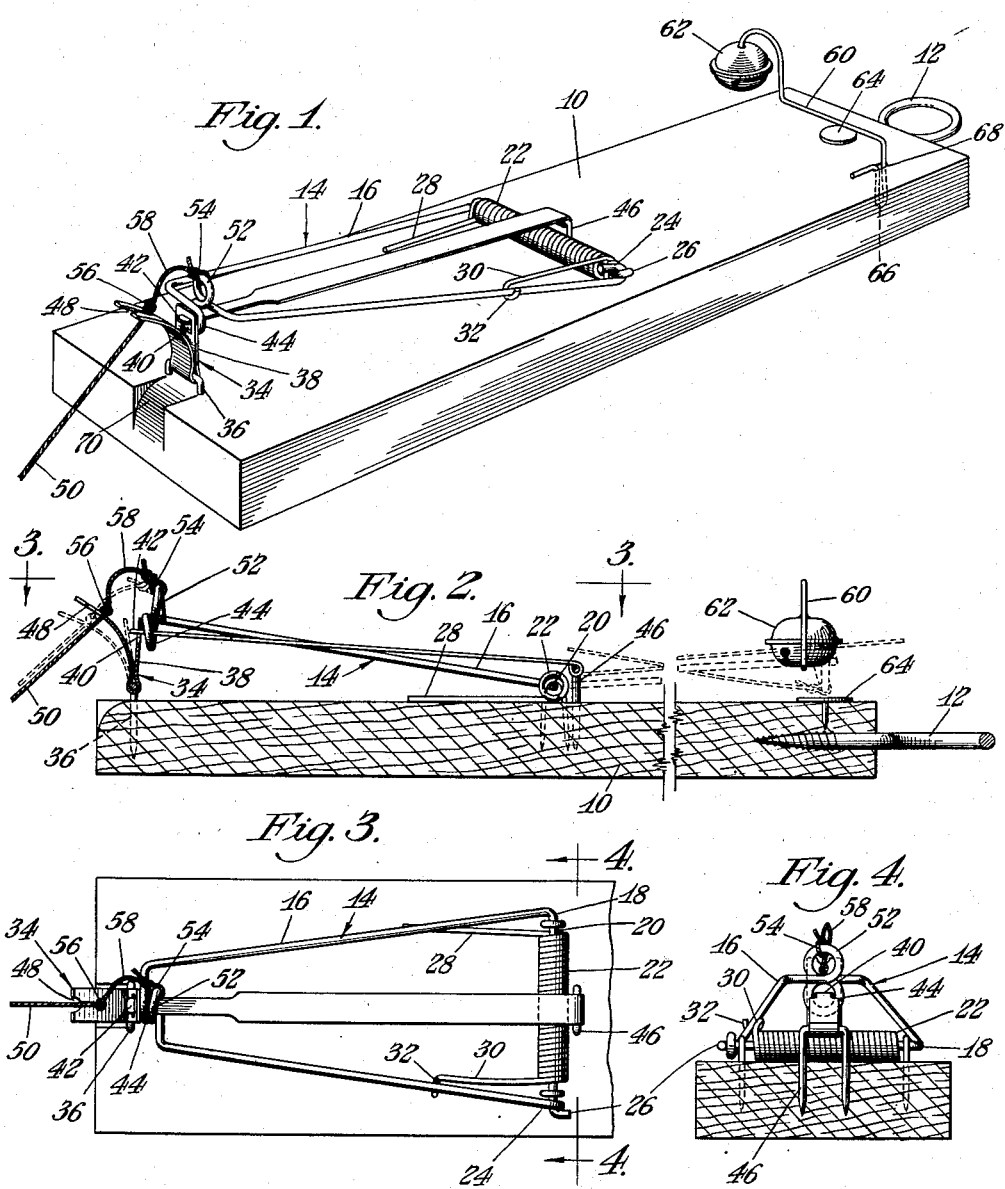
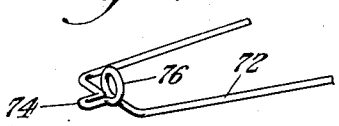
Charles H. Hawkinson.
INVENTOR
BY Victor J. Evans & Co.
HIS ATTORNEYS.

Patented Apr. 2, 1935

1,996,704

UNITED STATES PATENT OFFICE 1,996,704

FISHING APPARATUS

Charles H. Hawkinson, Chicago, Ill.

Application January 8, 1934, Serial No. 705,780

5 Claims. (Cl. 43—16)

My invention relates to fishing apparatus, and has among its objects and advantages the provision of an improved fish line holder, jerker, and signaling device.

This invention also consists in certain other features of construction and in the combination and arrangement of the several parts to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Fig. 1 is a perspective view of my invention;

Fig. 2 is a longitudinal sectional view;

Fig. 3 is a top plan view of a portion of the device;

Fig. 4 is a sectional view taken along the line 4—4 of Fig. 3; and

Fig. 5 is a view illustrating a different form.

In the embodiment selected to illustrate my invention, I make use of a base 10 comprising a board having a screw eye 12 fastened to one end to provide means for anchoring the base. A jerking lever 14 is mounted centrally of the base 10 and comprises a wire loop 16 having one end bent at 18 to provide a reach 20 upon which a coil spring 22 is mounted. One end of the reach 20 is passed through a loop 24 and bent at 26 to connect the two ends together. One end of the wire comprising the coil 22 is extended at 28 and bears against the base 10, while the opposite end of the wire is extended at 30 and has its extreme end bent at 32 to provide a small hook for connecting the coil spring 22 with the jerking lever 14. The drawing illustrates the jerking lever in its operating position, at which time the tension of the coil spring 22 tends to swing the jerking lever to the dotted line position shown in Fig. 2.

Means for releasably holding the jerking lever in the position illustrated in the drawing comprises a trigger 34 pivotally mounted upon a staple 36 driven into the base 10. This trigger is bent to provide a finger 38 having an opening 40 arranged to receive one end of a catch 42 loosely positioned within a loop 44 comprising a portion of the wire 16. The catch 42 extends inwardly of the base 10 and over the coil spring 22 and is pivotally connected with a staple 46. The loose connection between the reduced end of the catch 42 and the loop 44 permits relative movement between the two parts when the jerking lever is shifted from one position to the other.

One end of the metal strap comprising the trigger 34 is curved and bifurcated at 48 to provide a groove for receiving the line 50 to which the fish hook is attached.

Referring to Fig. 1, the wire 16 is provided with a second loop 52 to which the end 54 of the line 50 is connected. It will be noted that the line 50 is provided with a knot 56 arranged to bear against one side of the bifurcated portion. In other words, the amount of line between the knot 56 and the knot 54 is slightly greater than the distance between the loop 52 and the bifurcated portion of the trigger. Thus, this portion of the line possesses a certain amount of slack as indicated by the bow 58. This slack is sufficient to permit the trigger 34 to be moved from the full line position to the dotted line position in Fig. 2 before the slack is taken up. Shifting of the trigger in this manner brings the portion 38 out of engagement with the catch 42, thus releasing the jerk arm 14. I have found that the slack in the body 58 makes the trigger exceedingly responsive to a jerk on the line 50. Without the knot 56 a pull on the line 50 is transmitted to the swinging arm 14 in such a manner that the catch 42 is not always released from the trigger.

As soon as the catch 42 is released, the swinging arm moves with a rapid motion and strikes a wire arm 60 carrying a bell 62 providing an audible signal. I have arranged the loop 52 to strike the head of a nail 64 fastened to the base 10. This nail head prevents the swinging arm 14 from mutilating the base. One end of the arm 60 is looped at 66 and pressed into a slot 68 in the base. The looped portion 66 provides an elongated construction tending to resist rotary movement of the arm 60 about the longitudinal axis of the loop.

The device in the instant case is easy to set in that the swinging arm 14 provides a convenient grip. I have arranged the swinging arm 14 in such a manner with respect to the base 10 that a relatively long pull is attained with a base of relatively short dimension. It will be noted that the loop 52 moves through an arc originating at one end of the base and terminating at the other end. In this way, a relatively long pull is attained, and the action is a rapid one, making the device highly efficient. The loop 66 may be pulled out of the openings 68 to permit detachment of the part. Thus, the device may be arranged in a compact package.

In Fig. 1, I illustrate a cutaway area 70 arranged to accommodate the bifurcated portion of the trigger 34. Thus, the bifurcated portion is arranged in compact relation with the base 10 and is protected against bending in transportation.

In Fig. 5, I have illustrated a different form in which the end of the swinging arm 72 is looped to provide a finger 74 arranged to pass through the opening 40 in the trigger 34. This construction eliminates the necessity for the catch 42. One loop 76 is provided for the fish line, which loop also strikes the nail head 64 in the same way as the loop 52.

Without further elaboration the foregoing will so fully explain my invention that others may, by applying current knowledge, readily adapt it for use under various conditions of service.

I claim:

1. A fishing apparatus comprising a base, a spring operated jerking arm mounted upon the base, a trigger movably connected with said base, said trigger being provided with an abutment, a catch element carried by said jerking arm and arranged to be positioned against said abutment when the jerking arm is adjusted to an operating position, a bifurcated element carried by said trigger, a fish line connected with said jerking arm, and an element carried by said fish line and arranged to engage said bifurcated element when the fish line is passed between the tines of the bifurcated element, to provide slack in the fish line between the bifurcated element and the jerking lever.

2. In a device of the type described, a base, a spring-operated jerking lever mounted upon said base, a trigger movably connected with said base and having an extension provided with an opening, said jerking arm being provided with two loops, a catch member having one end projecting through one of said loops and its opposite end pivotally connected with said base, the end of said catch member projected through the loop being arranged to be passed through the opening in the extension of said trigger, to hold the jerking lever in an operating position against the tension of said spring, said trigger being provided with a second extension having a slot, a fish line having one end connected with the other of said loops, and a knot made in the fish line and arranged to engage the slotted portion of the trigger when the line is placed in the slot to provide slack in the fish line between the slotted extension and said loop.

3. In a device of the type described, a base, a spring-operated jerking lever mounted upon said base, a trigger movably connected with said base and having an extension provided with an opening, said jerking arm being provided with two loops, a catch member having one end projecting through one of said loops and its opposite end pivotally connected with said base, the end of said catch member projected through the loop being arranged to be passed through the opening in the extension of said trigger, to hold the jerking lever in an operating position against the tension of said spring, said trigger being provided with a second extension having a slot, a fish line having one end connected with the other of said loops, a knot made in the fish line and arranged to engage the slotted portion of the trigger when the line is placed in the slot to provide slack in the fish line between the slotted extension and said loop, an audible signal mounted on said base and arranged in the path of said jerking lever, and a metallic striking plate arranged in the path of one of said loops.

4. In a device of the type described, a base, a spring-pressed wire jerking member mounted on the base, a trigger having an opening, said wire being bent to provide a finger arranged to project through the opening in the trigger, to latch the arm in an operating position, said trigger being provided with a slotted portion, and a fish line connected with said jerking lever, said fish line being provided with an abutment element arranged to engage the slotted portion of said trigger to provide slack in the fish line between the slotted portion of the trigger and the jerking arm.

5. In a fishing apparatus comprising a wooden block having a spring operated jerking arm mounted thereon, an audible signal mounted upon said block in the path of the arm, said audible signal comprising in part a piece of wire bent to provide a normally horizontal part extending over a portion of the block for contacting with said jerking arm, another part of said wire being bent back upon itself to provide two portions arranged in close relation, said block being provided with an opening for receiving the portions arranged in close relation.

CHARLES H. HAWKINSON.